US007996312B1

(12) United States Patent
Beck et al.

(10) Patent No.: US 7,996,312 B1
(45) Date of Patent: Aug. 9, 2011

(54) SYSTEM AND METHOD FOR IMAGE BASED ELECTRONIC CHECK PRESENTMENT

(75) Inventors: Terry H. Beck, Advance, NC (US);
Andrew J. Garner, IV, Charlotte, NC (US); Kenneth S. Meloun, Winston-Salem, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1994 days.

(21) Appl. No.: 10/086,406

(22) Filed: Mar. 1, 2002

(51) Int. Cl.
*G06Q 40/00* (2006.01)

(52) U.S. Cl. ....... 705/42; 40/44; 40/45; 707/3; 707/200; 711/122; 382/305; 235/379

(58) Field of Classification Search .................. 705/40, 705/45, 44, 42; 707/200, 3; 711/122; 382/305; 235/379
See application file for complete search history.

(56) References Cited

U.S. PATENT DOCUMENTS

| | | | |
|---|---|---|---|
| 4,264,808 A | 4/1981 | Owens et al. | 235/379 |
| 4,270,042 A | 5/1981 | Case | 235/379 |
| 4,523,330 A | 6/1985 | Cain | 382/7 |
| 4,694,397 A | 9/1987 | Grant et al. | 364/408 |
| 4,823,264 A | 4/1989 | Deming | 364/408 |
| 5,038,283 A | 8/1991 | Caveney | 364/403 |
| 5,237,159 A | 8/1993 | Stephens et al. | 235/379 |
| 5,301,350 A | 4/1994 | Rogan et al. | 395/800 |
| 5,412,190 A | 5/1995 | Josephson et al. | 235/379 |
| 5,532,464 A | 7/1996 | Josephson et al. | 235/379 |
| 5,668,897 A | 9/1997 | Stolfo | 382/283 |
| 5,677,955 A | 10/1997 | Doggett et al. | 380/24 |
| 5,691,524 A | 11/1997 | Josephson | 235/379 |
| 5,754,674 A | 5/1998 | Ott et al. | 382/112 |
| 5,783,808 A | 7/1998 | Josephson | 235/379 |
| 5,784,503 A | 7/1998 | Bleecker, III et al. | 382/306 |
| 5,790,260 A | 8/1998 | Myers | 358/296 |
| 5,832,463 A | 11/1998 | Funk | 705/35 |
| 5,848,400 A | 12/1998 | Chang | 705/35 |
| 5,870,725 A * | 2/1999 | Bellinger et al. | 705/45 |

(Continued)

OTHER PUBLICATIONS

"Electronic check processing bill nears completion"; Anonymous. Today. Boston: Aug. 2001. vol. 23, Iss. 4; p. 34, 3 pgs.*

*Primary Examiner* — Harish T Dass
(74) *Attorney, Agent, or Firm* — Womble Carlyle Sandridge & Rice, PLLC

(57) ABSTRACT

A method and system for processing electronic check presentment (ECP) data and check image data, where the check image data is transmitted electronically, either with the ECP data or separately. The ECP data has associated ECP sequence numbers assigned in connection with the preparation of an electronic cash letter (ECL). The check image data has associated image sequence numbers assigned to the image file that is transmitted with or following the ECL. A source key and an image key are defined for each item in the ECP data and the image data. An electronic check presentment (EIP) sequence number generated at the receiving financial institution, associates each presented electronic item with the ECP sequence number and image sequence number. System components include a transaction and image import server, an entry creation module, a cross-reference archive load module, a reject repair module, a post preprocessor module and a posting module. These components enable transaction and image data to be imported to a host processing system, formatted, converted between standard image formats, repaired on the date received, archived and posted to customer accounts in a check truncation environment.

55 Claims, 10 Drawing Sheets

U.S. PATENT DOCUMENTS

| | | | |
|---|---|---|---|
| 5,930,778 A * | 7/1999 | Geer | 705/45 |
| 5,937,084 A | 8/1999 | Crabtree et al. | 382/137 |
| 5,940,844 A | 8/1999 | Cahill et al. | 707/526 |
| 6,059,185 A | 5/2000 | Funk et al. | 235/379 |
| 6,097,834 A | 8/2000 | Krouse et al. | 382/137 |
| 6,181,837 B1 | 1/2001 | Cahill et al. | 382/305 |
| 6,282,308 B1 | 8/2001 | Cossette | 382/137 |
| 6,301,379 B1 | 10/2001 | Thompson et al. | 382/137 |
| 2001/0018739 A1 | 8/2001 | Anderson et al. | 713/176 |
| 2001/0037299 A1 | 11/2001 | Nichols et al. | 705/42 |
| 2003/0208421 A1 * | 11/2003 | Vicknair et al. | 705/35 |

* cited by examiner

SYSTEM AND METHOD FOR IMAGE BASED ELECTRONIC CHECK PRESENTMENT

BACKGROUND OF THE INVENTION

The present invention is generally directed to electronic check processing. More particularly, the present invention is directed to image based processing of electronically presented items, such as bank checks.

Electronic check presentment ("ECP") is the electronic transmission of the contents of an interbank transmittal form known as a cash letter, or an electronic cash letter ("ECL"), as captured from the magnetic ink character recognition (MICR) line on each check, to the drawee bank ahead of the physical arrival of the checks actually in the cash letter. The electronic cash letter consists of a listing of items, i.e., checks drawn on a particular bank, referred to as the "payor bank." For each item, the ECL includes an item sequence number, a routing/transit ("RT") number, an account number and amount. Conventionally, a paper cash letter, including the physical paper items, is sent after the ECL is transmitted, and the paper items are recaptured by the payor bank and reconciled against the ECL. Often, check images are also digitized by the bank of first deposit, particularly, large banks that process a large number of checks, in connection with the reading and sorting of the checks. However, conventionally, even if the checks are digitized, the paper checks are still sent to the payor bank for reconciliation against the ECL.

Currently, the banking industry is moving toward check truncation, which is elimination of the physical paper items in the check processing system, preferably, by the bank of first deposit. Because the physical paper is "truncated" by the bank of first deposit, it is necessary to convert the paper items into an electronic debit and to create and store a digitized image of the check. Thus, in lieu of sending the paper cash letter, which includes the paper checks listed in the ECL, check image data is transferred to the payor bank either after the transmission of the ECL or with the ECL itself. The check image data can be transmitted via existing computer networks or stored on magnetic media, such as tape, and the magnetic media is physically transferred.

Check truncation, and the transmission of check image data, however, creates problems. One problem is preserving "linkage integrity." Linkage integrity is linking, i.e., electronically associating, the correct check image data with its ECP data, which was transmitted via the ECL and that is posted to the payor bank's Demand Deposit Account ("DDA") system. If linkage integrity is not preserved, it becomes difficult, if not impossible, to retrieve the check image data corresponding with ECP data. A bank may need to retrieve check images in connection with providing account statements to bank customers or for internal research purposes.

Another problem associated with check processing and electronic check presentment and check truncation, in particular, is in the area of reject repair. Generally, a reject is an item (in an ECL) for which magnetic ink character recognition (MICR) codeline data is missing or incomplete. Conventionally, rejects could not be repaired until the physical paper items were received via the paper cash letter. Since the paper cash letter often was not received by the payor bank until the day following the transmission of the ECL, the payor bank would go through a processing cycle and rejects would not be posted until the next day.

Another problem that is associated with using image data in connection with ECL processing is that many financial institutions have significant capital and personnel training investments in existing check processing hardware and software. In particular, many financial institutions have implemented check processing using the Check Processing Control System ("CPCS") product available from IBM Corporation, and would prefer to leverage their investment in CPCS as they transition into the check truncation environment and image based ECL processing.

Yet another problem associated with image based ECL processing is handling image errors. The present invention provides for the flagging of image errors. These error conditions can be related to the size of an image segment or to a missing image segment. An import process can also flag image conversion errors when there is a need to convert the source image format to an alternate format. Responsive actions to the errors are based on user-defined parameters.

SUMMARY OF THE INVENTION

The system and method of the present invention processes ECP data and check image data files so that all items can be validated, corrected, posted and loaded to the image archive from an external source without being required to process the paper checks. The process supports two embodiments. In a first embodiment, ECP data is transmitted with an "image to follow." In a second embodiment, check image data is transmitted with the ECL. This process is also compatible with an ECP and check "paper to follow" method, in which the paper checks are recaptured and the check image data is "matched" to the ECP data using existing image recapture match software.

One aspect of the present invention provides a system and method to ensure such linkage integrity when check image data is sent after the ECL. Linkage integrity is preserved by associating the source sequence number, which is the sequence number assigned to an item by the sending institution. The source sequence number is associated with both (1) the ECP sequence number, which is the item sequence number that is assigned in connection with the receipt of the ECL, and (2) the image sequence number, which is the sequence number assigned to the item's image data that is transmitted with or following the ECL. The receiving bank, i.e., the payor bank, can then associate the ECP sequence number with the correct image sequence number by matching the source sequence numbers. Conventionally, the matching process was performed by recapturing the physical items sent with the paper cash letter, including MICR codeline data and imaging the paper item. The ECP data was associated with the check image data by matching the MICR codeline data received via the ECL with the MICR codeline data obtained during the recapture of the physical items by the payor bank. Codeline data matching enabled the check processing system to detect and compensate for unreadable characters and assisted in the isolation of missing items or incorrect sorts from previous passes. Codeline data matching carried the incoming sequence number from pass to pass. The linking of the image data and the ECP data allows for auditing of the data to ensure the correct transaction is associated with the appropriate image. Automatic verification is performed to ensure duplicate source items are not processed.

Another aspect of the present invention is a system and method that permits the payor bank to repair rejected items using the image data in sufficient time to allow for the posting of the rejected items along with the items receiving via the ECL. In the present invention, checks that are received with incorrect or incomplete MICR codeline information are repaired via an image enabled reject repair process. The image reject repair process utilizes the existing online reject reentry (OLRR) function of CPCS along with an image-enabled workstation to allow operator review and repair of an item based on the received check image. This allows all rejects to be repaired under direct control of CPCS eliminating the need for waiting on the physical paper to perform the repair. This integrated CPCS approach ensures the repaired image is always associated with the correct posting data. This process is completed in a timeframe that is consistent with an operational deadline driven environment, allowing users access to images shortly after they are loaded, and the rejected items to be posted the same day.

Another aspect of the present invention is to allow a financial institution to perform image based ECL processing using an existing CPCS infrastructure. The system and method of the present invention allows for capture data and cycle information to be created or derived for use in creating the CPCS transaction record and the image keys. The system also allows tapes and/or transmission files to be processed and logged from multiple sources.

DESCRIPTION OF THE DRAWINGS

The invention is better understood by reading the following detailed description of an exemplary embodiment in conjunction with the accompanying drawings.

DETAILED DESCRIPTION OF THE INVENTION

The invention is directed to an image-based electronic check presentment (ECP) processing system that handles either ECP transaction data with image data or ECP transaction data with image data to follow. The present invention can be a stand-alone application or can interface with third-party ECP applications as required. Electronically presented "checks" are sometimes referred to more generally as electronically presented "items," and the terms are used interchangeably throughout this description. Processing ECP transactions and their associated images on the day they are captured at the bank of first deposit, greatly improves the turn-around time to post a check, provides the bank and customers access to the item sooner than paper permits, and can allow for earlier fraud detection. A source sequence number is associated with both the ECP sequence number that is assigned in connection with the preparation and transmission of the electronic cash letter (ECL), and the image sequence number that is assigned to the image file that is transmitted with or following the ECL. The receiving financial institution can then associate the ECP sequence number with the correct image sequence number by matching the source sequence numbers.

The system can process incoming tape or transmission data on either a server or mainframe platform. Schematic representations of the system and its component processes are depicted in FIGS. 1-6. The processing logic corresponding to several of the component processes are depicted in FIGS. 7-10.

Figure 1:
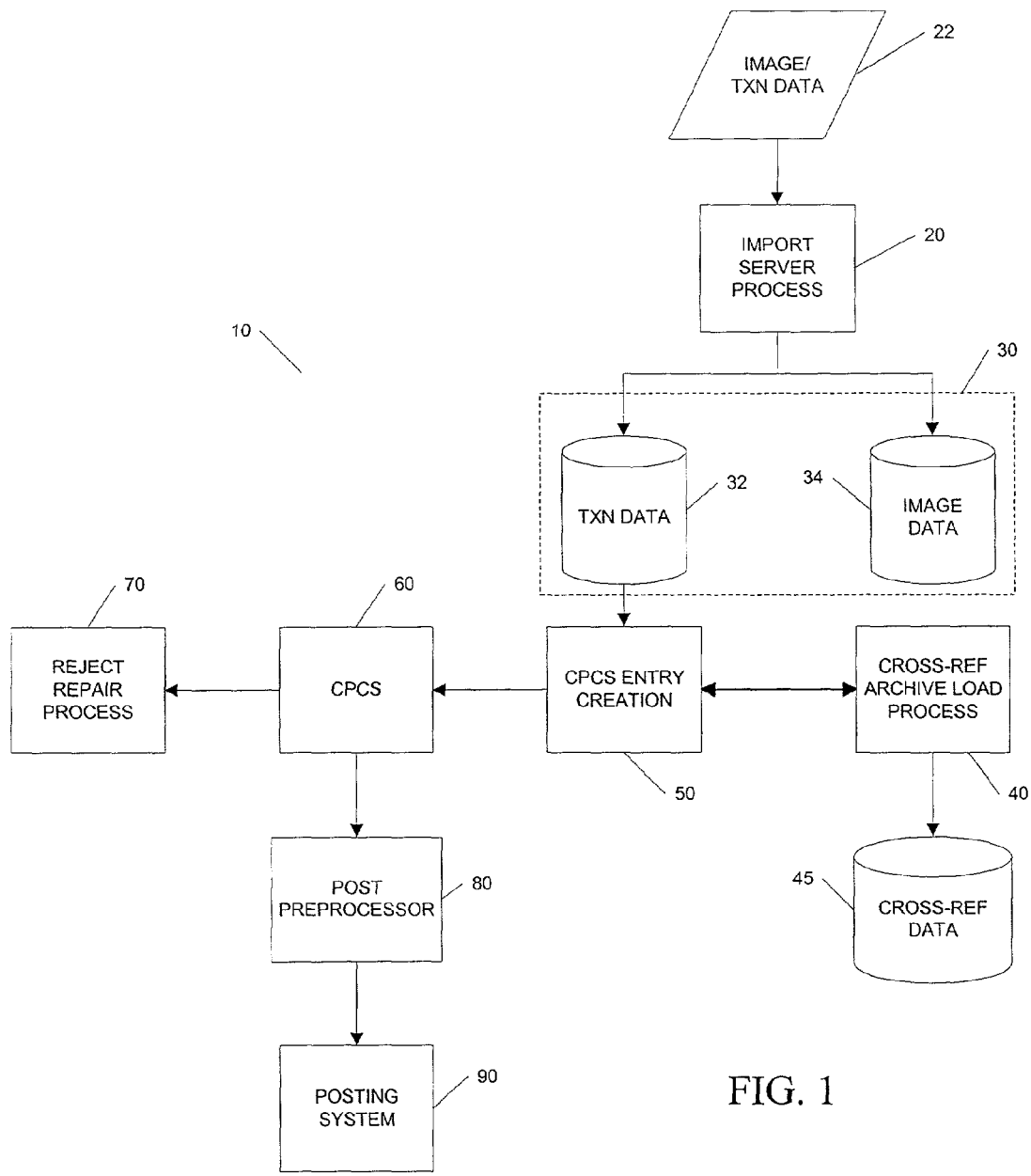
FIG. 1 illustrates a schematic representation of the image check exchange system of the present invention.

As illustrated in FIG. 1, the system 10 includes a number of components, including: (1) a transaction and image import server 20 with image conversion capability; (2) an entry creation module 50; (3) cross-reference (XREF) archive load module 40; (4) reject repair module 70; and (5) DDA post pre-processor 80. The terms component, module and process are used interchangeably throughout this description. Also shown in FIG. 1 are an image and transaction data file 22, a transaction database 32, an image database 34, a check processing and capture system 60, a posting system 90 and a XREF archive database 45 associated with the XREF archive load process 40. Collectively, transaction database 32 and image database 34 are referred to as database 30.

The transaction and image import server 20 is a distributed application for the server that enables the control of data copying from a tape or transmission to the server hard drive. The number of processors for the import server depends on the number of files that the financial institution intends to process in parallel. Each day the financial institution processes data, a start-of-day process within the application must be executed, which sets the processing date and cycle. In addition, the sequence number file is set to start at one. Each server must be identified using a unique sorter number, which is the prefix to a rolling sequence number. The sequence numbers created on the import server are identified as image sequence numbers.

The import server module 20 is used to import the transaction and image data 22 from one or more servers to the host for image archiving and transaction processing. Transaction and image data 22 can be received from either tape or transmission at the server and imported to the host via a message queuing product such as the MQSeries product available from IBM Corporation. Image data is loaded directly into a check image management system (CIMS) utility, such as the Check Image Management System product available from Check Solutions. The transactions 32 are used to create CPCS entries 50 and update the cross-reference (XREF) archive 45. The cross-reference archive 45 includes transaction and image data.

Figure 2:
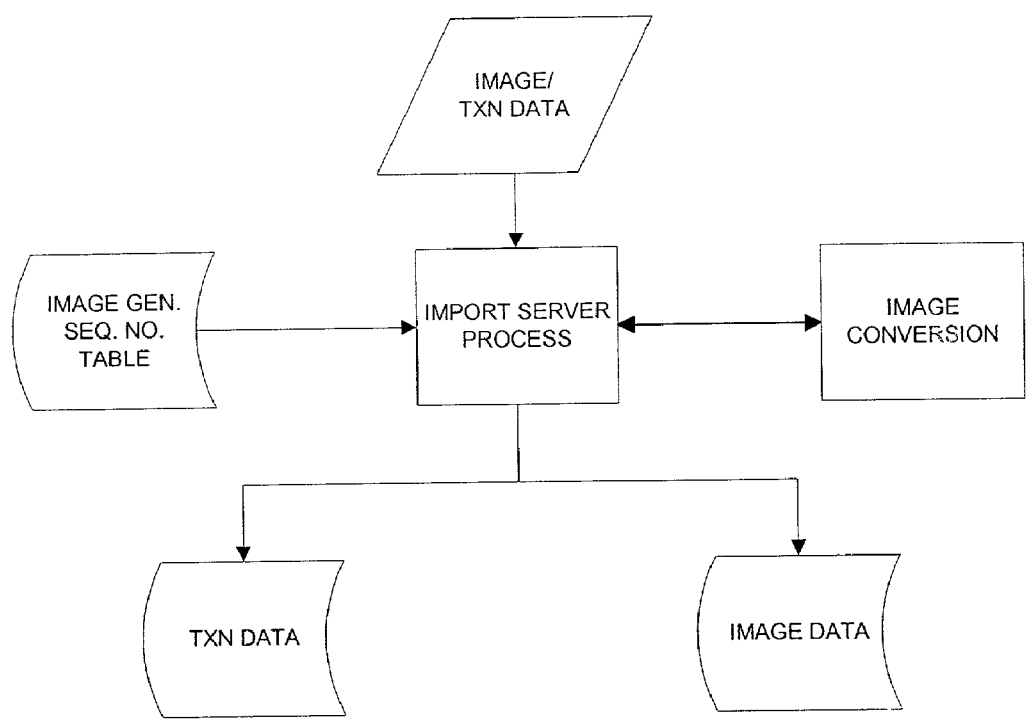
FIG. 2 illustrates an image electronic check exchange (ECE) import server process in accordance with an exemplary embodiment of the present invention.

The import server process 20 is illustrated in FIG. 2. Each item in transaction and image data file 22 is given an image sequence number by image-generated sequence number table 24 that follows the transaction through its life cycle and is used to define the key for the associated image. The transaction data is formatted, written to an MQSeries queue and transmitted to a host queue. The source sequence number, source routing and transit (RT) number and date are used to link the ECP and image transactions.

If the images require a format conversion, a conversion application 28 can convert most standard image formats, such as the Joint Photographics Expert Group (JPEG) standard or G4. In an alternate embodiment, the image wrapper, such as the Tagged Image File Format (TIFF), is also converted. This is a nontrivial matter, since a JPEG grayscale image is an object much larger than a standard black and white image. Accepting JPEG images directly impacts direct access storage device (DASD) requirements. If a financial institution only supports TIFF/G4 black and white images, but receives a JPEG image, the JPEG image must be decompressed, and then recompressed into TIFF/G4 format. The image is then written to a second MQSeries server queue and transmitted to the host where it is automatically written to the image database 34 (i.e., CIMS) using the image sequence number, cycle, and cycle date as a key. This removes the conversion overhead at the mainframe, and enables verification of the quality prior to loading CIMS.

With a server process, the image data contained in the image file 34 is evaluated in an attempt to assure that the quality of the front and back images falls within the boundaries of an acceptable image. This is based on the size of the image object. The quality status of the front and back are used to set flags in the corresponding transaction record prior to going to the host. All transactions are sent to the host for cross-reference (XREF) archiving, but the image status determines whether the record is included in a CPCS entry. An item with a bad front will not go to the CPCS 60, but will reside in the cross-reference (XREF) data archive 45. Items with good fronts and bad backs normally go to CPCS 60 and the cross-reference (XREF) data archive 45.

If a transaction file 32 had a problem uploading or if there was a problem at the host, the server application 20 can retransmit the items and/or the images using the original image sequence numbers or can create new image sequence numbers. The system 10 provides back office facilities at the host to automatically clean out the old items. Entries that are created in CPCS 60 and that are incorrect must be manually deleted.

Figure 7:
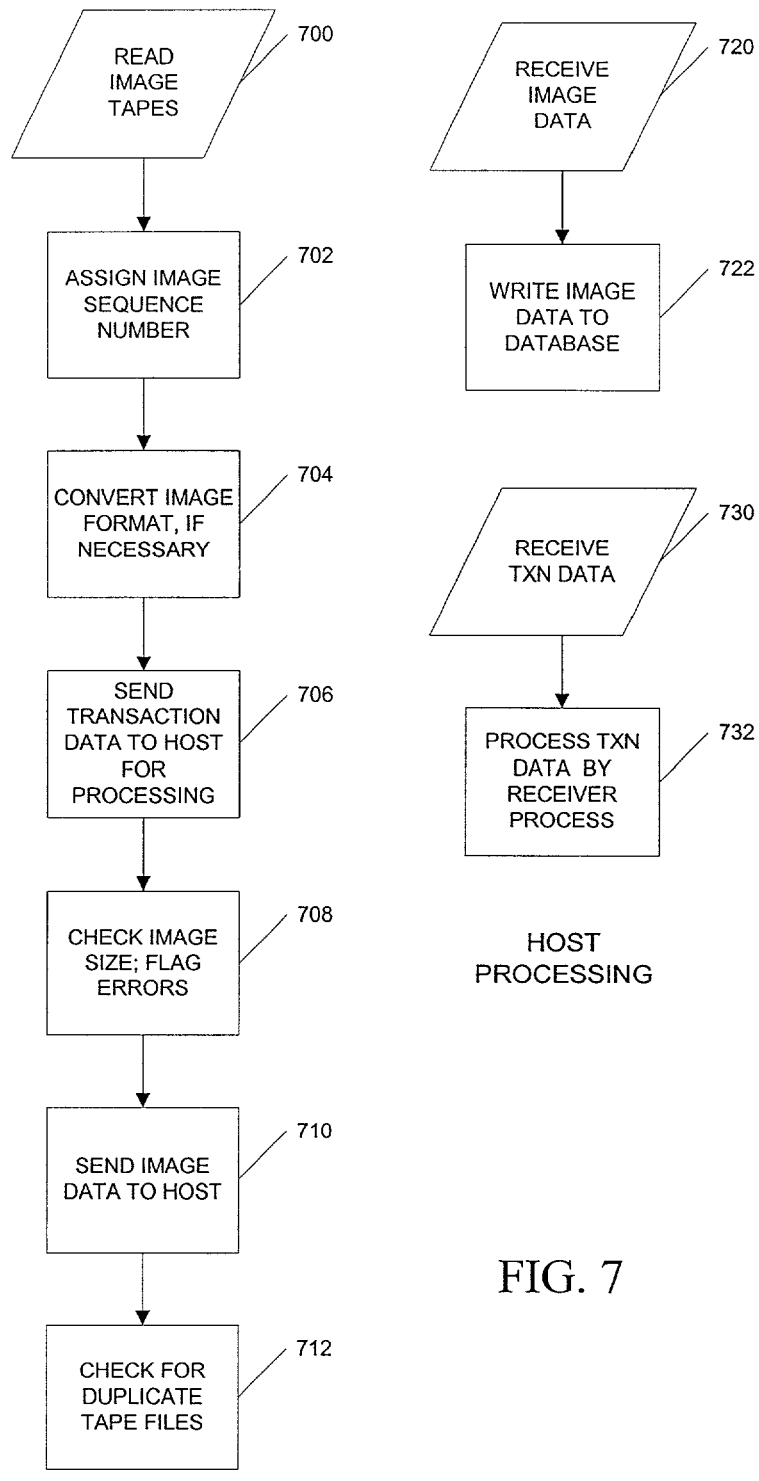
FIG. 7 illustrates the processing logic for the import server process in accordance with an exemplary embodiment of the present invention.

The processing logic for the import server process is depicted in FIG. 7. The left side of FIG. 7 show the steps performed by an import server. In logic block 700, the import server reads each image tape or transmission. An image sequence number is assigned with a unique sorter number assigned to each server as indicated in logic block 702. If the image needs to be converted for processing by the host processor, an image conversion is performed in logic block 704. For example, a JPEG image may need to be converted to a TIFF/G4 image. The transaction data is sent to the host processing system for capture by the CPCS system as indicated in logic block 706. Next, the image data is checked for size and image errors are flagged as indicated in logic block 708. The image data is then sent to the host processing system where it will be written to a CIMS image data file as indicated in logic block 710. The import server also checks for duplicate tape files as indicated in logic block 712.

The right side of FIG. 7 shows the steps performed by the host processing system in conjunction with the files received from the import server. Image data is received at the host (logic block 720) and automatically written to the CIMS image database (logic block 722). Transaction data is received from the import server (logic block 730) and is processed by a receiver program that is part of the entry creation process (logic block 732).

Figure 3:
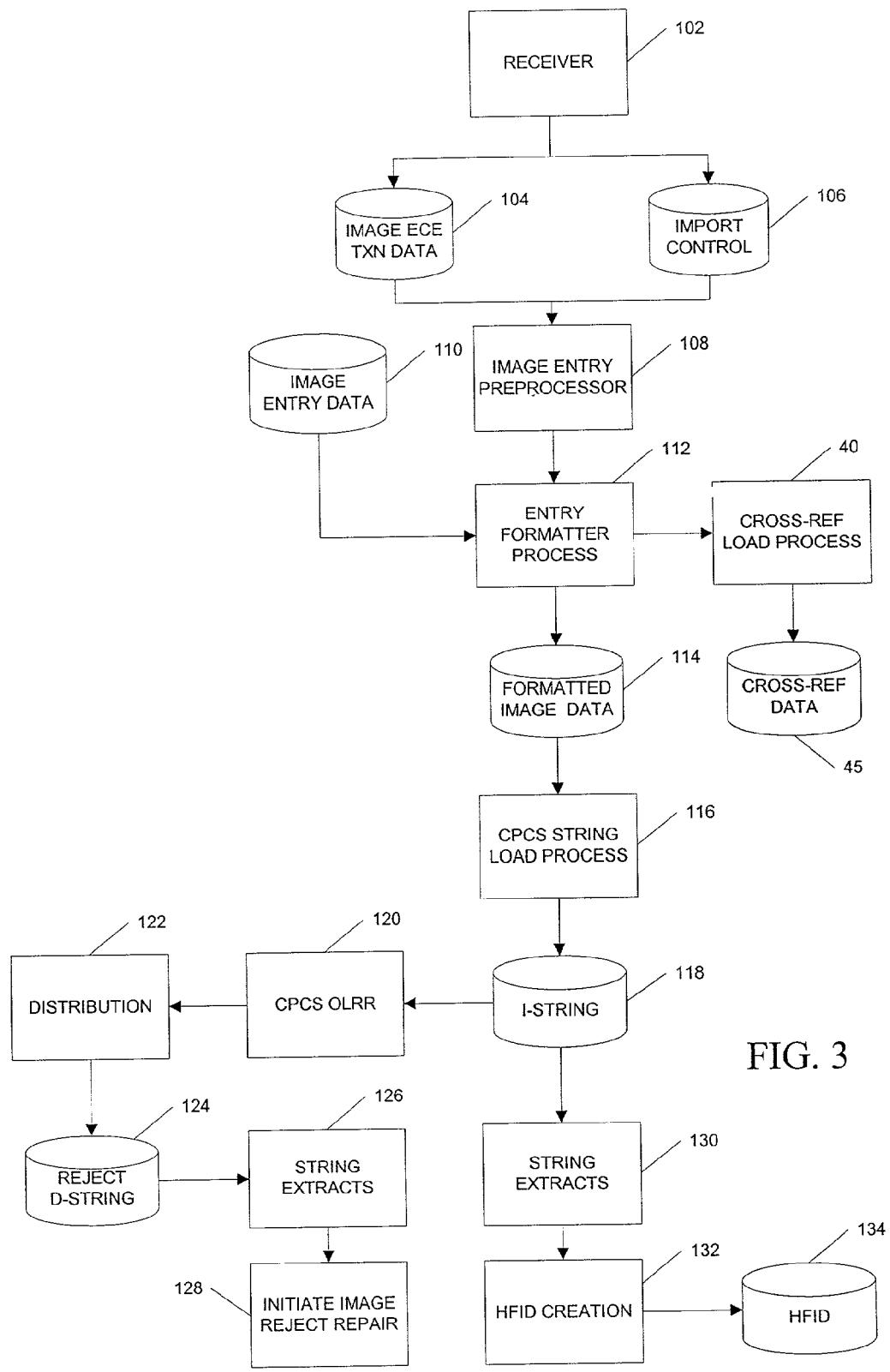
FIG. 3 illustrates an image ECE creation process in accordance with an exemplary embodiment of the present invention.

The entry creation process is illustrated in FIG. 3. The transaction files residing in the MQSeries queue are processed by a receiver utility 102, which creates a unique sequential file 104 for each file in the queue. When all the files that came in on a tape or transmission have been written successfully to sequential files 104, the process 112 to format the entry begins. An entry also can be created from an individual file from the tape or transmission, the entire tape or transmission, or by record count.

The entry creation module is responsible for monitoring the host portion of the MQSeries queues residing on the host that receives transaction data from the import server 20, the creation and submission of CPCS entries 50, and submission of transmission and control data to the cross-reference (XREF) archive 45. The image sequence number generated in the import server process 20 is used as the item sequence number for the CPCS entry 50. The entry is initially created as an I-string (input string) 118 that triggers an OLRR edit and distribution process 120 to create the reject D-string 124. The OLRR edit process 120 provides both validation and pocketing. The reject D-string 124 is corrected by the reject repair component 70. The I-string 118 is the group of data records created within a data set for an entry.

A financial institution-driven parameter file is provided to define the number of control documents for each entry such as batch, block, tracer, credit tickets, and whether totals should be included. A batch is a group of checks (kill bundle) from another financial institution. A block is a group of batches originating from the same source, such as a cash letter originating from another financial institution. A tracer identifies the entry number and the beginning of an entry. One or more batches can be combined into a unit of work for a document processor. The image sequence numbers created during the import server process become the CPCS sequence numbers when the I-string is written to CPCS. After each CPCS string level is created, I, M and 99-M, a string upload task is started to create intra-day history (HFID) records (in process 132) for intra-day access to the transaction and image data 134.

In an "image to follow" ECP environment, where one input file is the ECP transaction data and the image data is received via a second file, the financial institution has the option to ignore the creation of HFID records from the CPCS strings generated from the ECP transaction data files. This prevents the financial institution from seeing two occurrences of an item. One is strictly MICR data and uses the ECP posting sequence number, while the other is the MICR and image data that is associated with an image entry and uses the image sequence number and associated image key. It should be noted that the terms MICR data, codeline data and transaction data are used interchangeably throughout this description. In addition to image ECE records, non-ECP strings can be uploaded and archived for intra-day viewing, such as low speed items captured with conventional check readers/sorters. Using this method for HFID creation, images are available intra-day shortly after the image tapes are processed. Duplicate ECP generated records are not displayed. If an image is missing, the record is not available for access, even though it may have been sent on the ECP transaction data transmission. Missing image records show up in the archive history the next day as reversal records as a result of the DDA update process.

Figure 8:
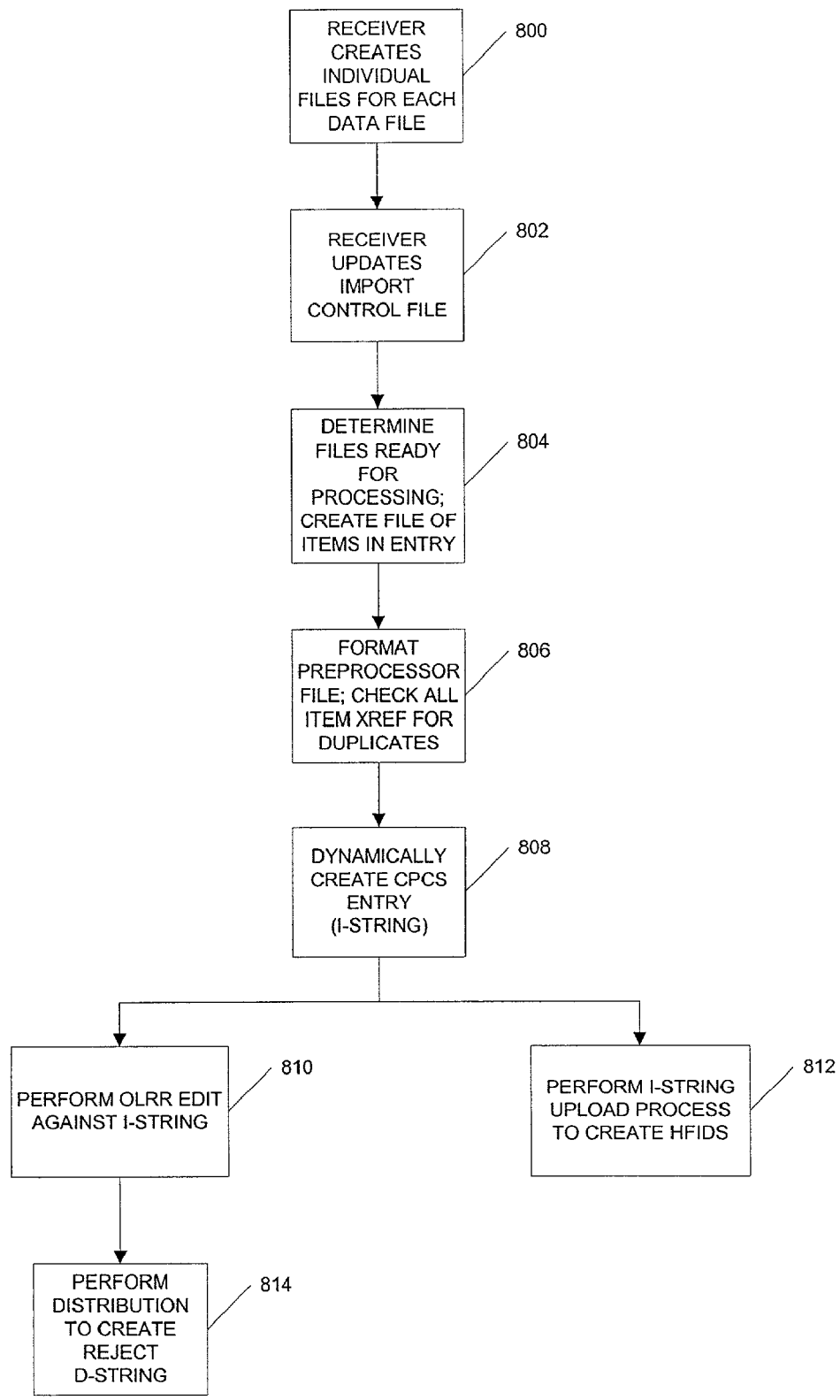
FIG. 8 illustrates the processing logic for the image ECE entry process in accordance with an exemplary embodiment of the present invention.

The processing logic for the entry creation process is depicted in FIG. 8. The receiver program at the host processing system creates individual files for each data file on the MQ Series queue as indicated in logic block 800. The receiver updates an import control file in logic block 802. The image entry pre-processor determines which files are ready for processing and creates a pre-processor file of all the items in an entry as indicated in logic block 804. An entry formatter takes the pre-processor file and checks the all item cross-reference (XREF) for duplicate entries as indicated in logic block 806. The CPCS load process then reads an electronic control file for a unit of work requiring processing and dynamically creates a CPCS entry (I-string) as indicated in logic block 808. The CPCS OLRR function runs against the I-string to define the pockets to which the items should be assigned. This step is indicated in logic block 810. The distribution process is then triggered as indicated in logic block 814 to create the reject D-string for reject processing. The I-string generated by the CPCS load process (logic block 808) triggers an upload process to create HFIDs as indicted in logic block 812.

Figure 4:
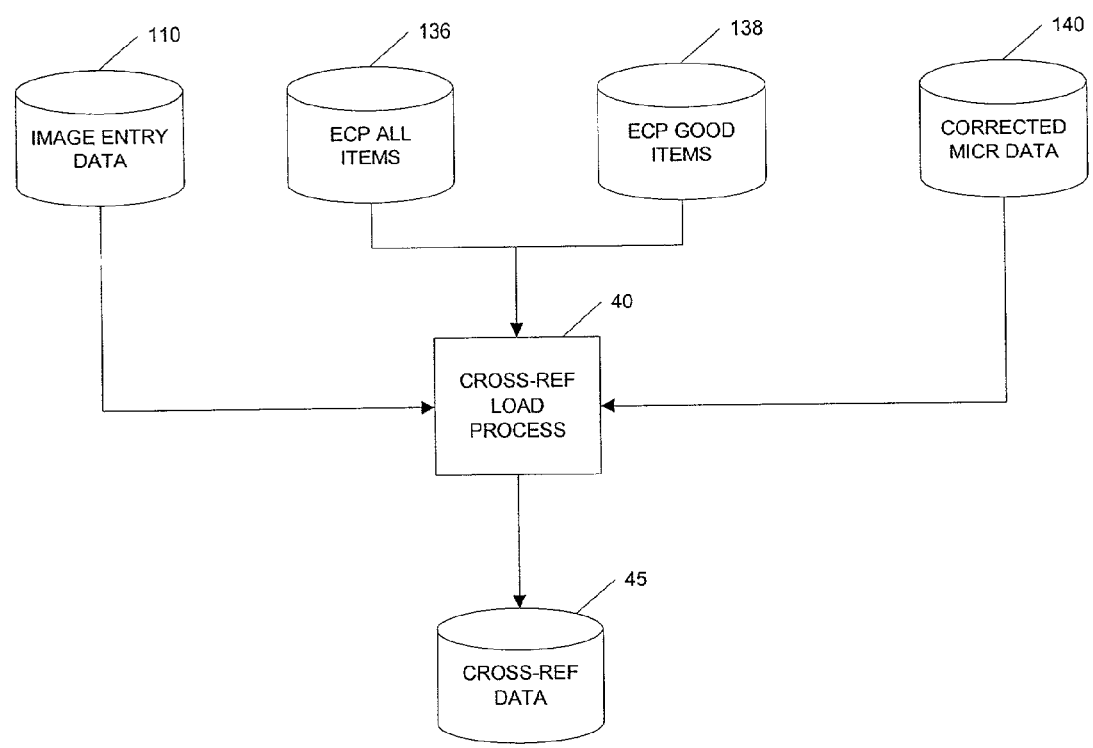
FIG. 4 illustrates an image ECE XREF archive load process in accordance with an exemplary embodiment of the present invention.

FIG. 4 illustrates the cross-reference (XREF) archive load process. The XREF archive process 40 imports all transaction files related to initial ECP processing and import processing. The data from ECP all items file 136, ECP good items file 138, image data 110, and corrected MICR data 140 are linked together using the source sequence number, source RT, and source processing date (i.e., source key). Examples of these files are Federal Reserve ECP transmission files, Federal Reserve data files, ECP files from financial institutions with imaging capabilities such as American National Standard (ANS) X9.37 image files, and third party ECP applications. ANS X9.37 is an approved industry standard for exchange of payment data. The Federal Reserve plans to adopt the X9.37 format as its single standard for MICR detail transmission. The cross-reference (XREF) archive 45 has one primary key, which includes the source sequence number, source R/T and source business date. The XREF archive 45 links the source sequence number to the transactions coming from the image ECP import files 30, including the ECP assigned sequence number, the image assigned sequence number and the resulting posting sequence number. The XREF archive 45 is the driver file for all end of day (EOD) reporting and feeds.

The XREF archive process 40 imports all transaction files 32, 34 related to initial ECP processing and import processing. For financial institutions running ECP with image to follow, each ECP file 136, 138 is loaded to the XREF archive 45, including items that may reject in a preprocessor. Every item that is added to the XREF archive 45 must have a source sequence number, source RT, and source processing date. This is because they are part of the XREF archive key. By using the source information as the key, the image transactions in any ECP good item feeds 138 will be linked to the incoming transaction for a full audit trail. ECP good items are defined as items that passed the OLRR edit process 120, were written to a "warehouse," and were not found to be a duplicate MICR match. The XREF archive 45 can process multiple input files from different sources throughout the day.

The image transaction data 30 used in the entry creation process 50 updates the XREF archive 45 with the image sequence number and updates the transactions status flags. The update links the source sequence number to the image sequence number. If no source sequence number is found, the transaction record 30 is added to the XREF archive 45. If the source sequence number is found, and there is already an image sequence number linked to it, the updating transaction is considered a duplicate. The record is written to the duplicate record file and dropped from the I-string prior to loading to CPCS 60. In addition to the original ECP file 136 and the image file 110, other internal feeds such as an ECP good items 138 and the image ICRE will update the XREF archive's status flags, linking sequence number fields, and MICR data. The image ICRE will supply the corrected MICR information coming out of the image reject repair component.

Figure 5:
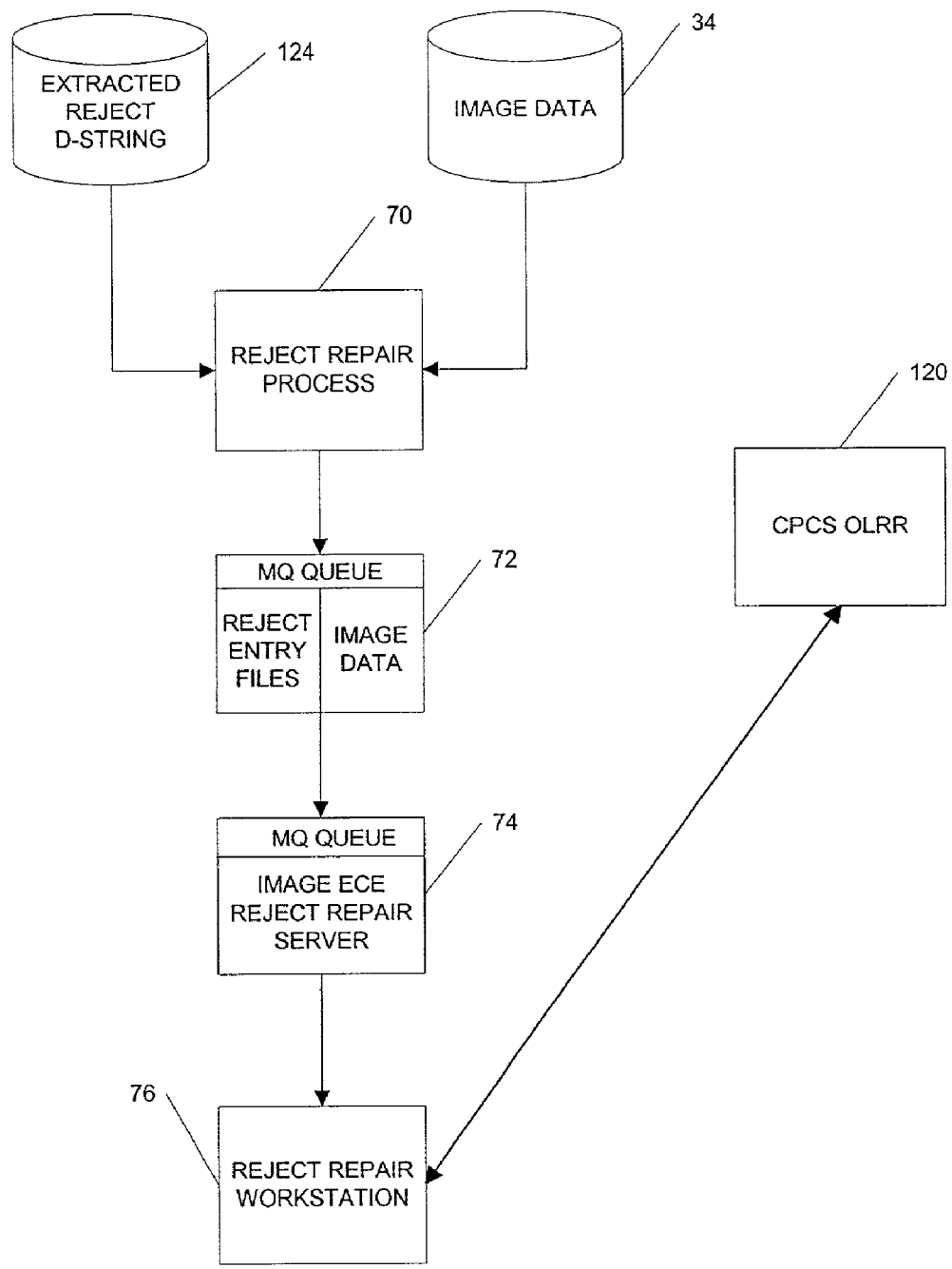
FIG. 5 illustrates an image ECE repair process in accordance with an exemplary embodiment of the present invention.

The reject repair process is illustrated in FIG. 5. The reject repair process 70 allows the financial institution to correct items in the reject D-string 124 using the associated image 34 and by image enabling the CPCS OLRR function 120. This process enables financial institutions to repair rejected ECP transactions that have historically been dropped from posting due to the lack of the paper check. This process uses the image 34 to correct the bad MICR. The online reject reentry (OLRR) function of CPCS is utilized along with an image-enabled work station to allow operator review and repair of an item based on the received check image. This allows all rejects to be repaired under control of CPCS, eliminating the need for the paper to perform the repair. The paper only has to be processed for returns and statements after posting. The reject repair process 70 enables current day correction and DDA posting 90.

Once the entry creation process 50 loads the I-string into CPCS 60, an autostart is executed to edit the string 126 using the CPCS on-line reject reentry (OLRR) function 120. OLRR process 120 generates a status for each item and defines the pockets. Distribution 122 can then run to create the reject D-string 124. The D-string 124 triggers the accumulation and download of the string data and associated images to an image reject repair server 70. The reject repair component 70 is then used to correct the rejected items by providing a graphical user interface (GUI) to the CPCS OLRR function 120. The interface allows the user to request, by capture site, the reject string that the user wants to correct. Once chosen, the string and image data is downloaded from the server to the reject repair workstation 76 for processing. The GUI application brings up OLRR 120 and feeds this string request. As each item is processed in OLRR 120, the associated image 34 is displayed so the highlighted field or fields can be corrected. An OLRR edit check is performed on each corrected field. All fields must parse the edit or the item must be set with a default RT/account. The corrected string can be merged with the I-string to create the M-string. Historically, these items had been discarded because there was no timely way to correct them without the paper. The reject repair process allows these items to be posted along with the good items, instead of waiting for the paper.

Figure 9:
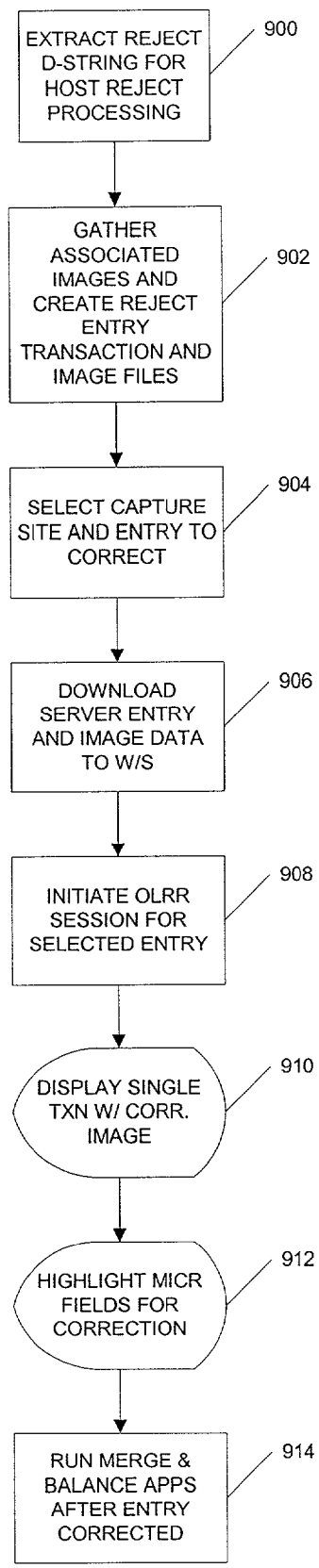
FIG. 9 illustrates the processing logic for the image ECE reject repair process in accordance with an exemplary embodiment of the present invention.

The processing logic for the image reject repair process is depicted in FIG. 9. The entry creation process (FIGS. 3, 9) triggers the CPCS to create an extracted reject D-string for host reject repair processing as indicated in logic block 900. The extracted D-string triggers a host process to collect all associated images and to create reject entry transaction and image files which are pushed to the reject repair server as indicated in logic block 902. A user operating a reject repair workstation selects the capture site and entry to correct based on the files available on the reject repair server as indicated in logic block 904. The selected entry and image data is downloaded to the reject repair workstation as indicated in logic block 906. The user logs onto CPCS and initiates an OLRR session for the selected entry as indicated in logic block 908. the workstation application displays one transaction at a time with the corresponding image (display block 910) and highlights the MICR fields for correction using the OLRR function (display block 912). After the entry is corrected, merge and balance applications can be run as indicated in logic block 914.

Figure 6:
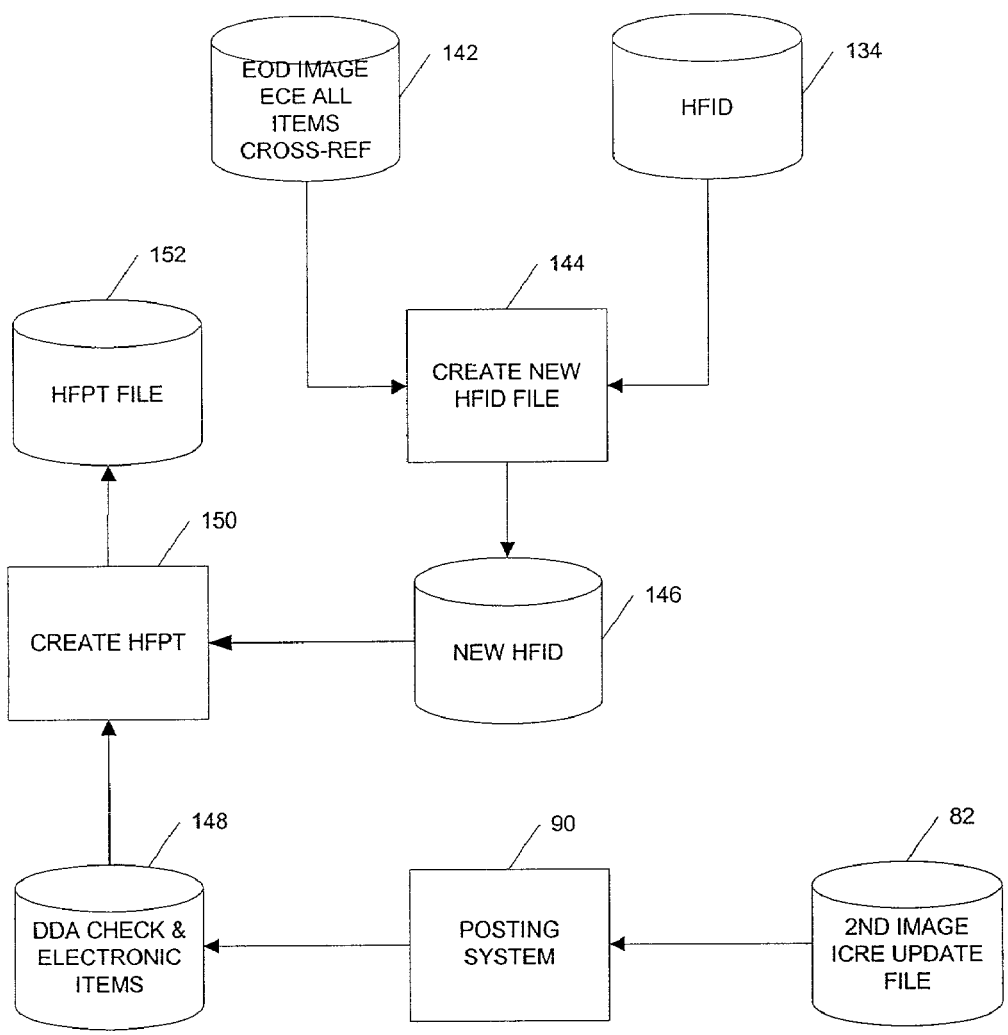
FIG. 6 illustrates an image ECE DDA post preprocessor in accordance with an exemplary embodiment of the present invention.

FIG. 6 illustrates the DDA post pre-processor. The DDA post pre-processor 80 uses the CPCS image ICRE and the XREF archive 45 to create updated image archive intra-day history records 142. Intra-day history records 142 are used to view the transactions and images that came in throughout the day. This update ensures the correct posting sequence number is correctly linked to the associated image key. Duplicate MICR and rejected MICR items can be archived along with the ECP good items. This process can also update the image ICRE with the proper posting status if needed. A file can also be generated of missing items that can be used to generate posting reversals.

During normal DDA posting processes 90, the check transactions coming out of DDA 148 are archived to the image archive 45 by matching the check DDA transactions to intra-day history (HFID) transactions created in the entry creation processes. This matching process generates the long-term transaction archive files (HFPT) 152. In an ECP with image to follow environment, the majority of the DDA transactions will post with the generated ECP sequence number instead of the generated image-generated sequence number. The true posting sequence number must be linked to the image key in the HFPT record 152 for archive and retrieval purposes. For this matching process to work, the HFID record 134 must have the same posting sequence number as the DDA posting sequence number. Since the original HFID 134 will only have the image sequence numbers as its posting sequence number, the HFID sequence number must be toggled to the DDA posting sequence number for ECP good items. This DDA posting sequence number is generated from the ECP sequence number contained in the ECP ICRE. All other items remain unchanged since the DDA posting number is the same as the image sequence number contained in the image ICRE.

The DDA post-preprocessor 80 takes the intra-day history file (HFID) and the XREF archive's current cycle transactions, and creates a new intra-day history file (New HFID) 144. The XREF archive 45 is used to create the New HFID file by searching the original HFID file 134 for the corresponding HFID record. Once found, a New HFID record 144 is generated using the correct DDA posting sequence number contained in the XREF archive 45. The image sequence number is retained in an image key field in the new HFID record 144. The XREF archive 45 contains the image sequence number, ECP sequence number, and the actual DDA posting sequence number.

Because of the above HFID update, the HFPT creation process 150 is able to match the correct HFID record 146 to the DDA posting record 148. The HFPT record 152 includes the correct DDA posting sequence number and will be linked to the correct image key. The correct source data contained in the HFID recorded is maintained in the HFPT record 152. In this manner, a DDA posting sequence number is always linked to the image and the source data.

Figure 10:
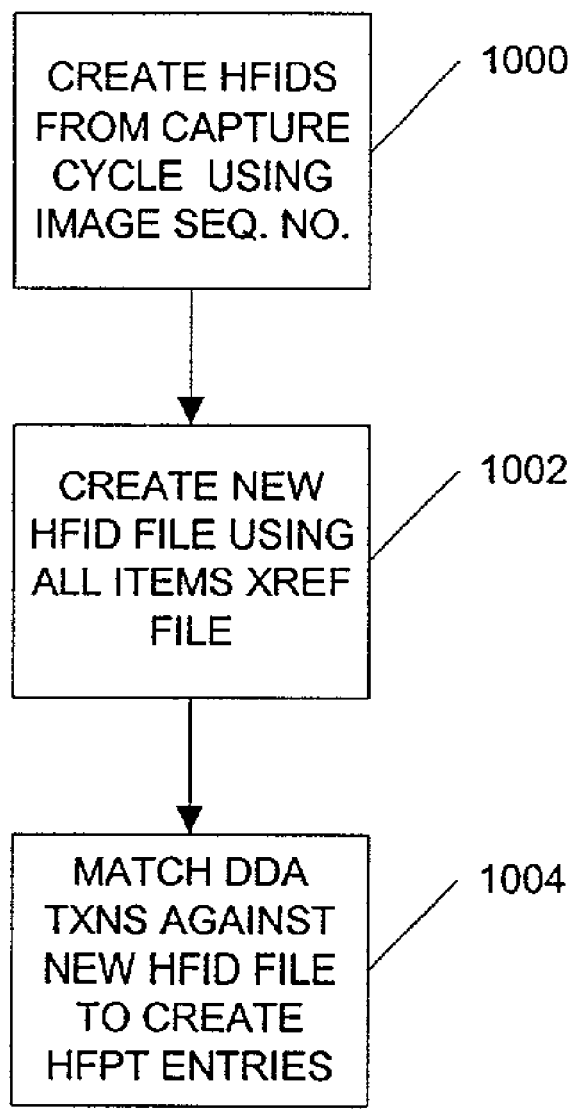
FIG. 10 illustrates the processing logic for the image ECE DDA post pre-processor process in accordance with an exemplary embodiment of the present invention.

The processing logic for the DDA post pre-processor is depicted in FIG. 10. The HFIDs are created from the capture cycle only and initially uses the image sequence number in the key as indicated in logic block 1000. After the end of day (EOD) process for the cross-reference (XREF) archive is complete, a new HFID file is created using the all items XREF file as the driver (logic block 1002). The new HFIDs will use the posting sequence numbers from the ECP good items file as its primary key, or the image sequence number for items that were processed by the reject repair module. The ECP DDA transactions are matched against the new HFID file during the HFPT creation process as indicated in logic lock 1004.

For financial institutions running third party ECP applications within their current environment, the system can interface to that product. For example, the system can interface with the CheckLink® application available from Carreker Company by providing an image reconciliation file that can be used to ensure the correct item was matched in the warehouse with the correct image (paper) sequence number. Reversal of any items for which electronic items were posted on one day but the paper does not come in on the next day are automatically generated by the CheckLink® application.

The third party interface supplies a duplicate MICR file that feeds the ECP warehouse update and image ICRE update process. This allows the financial institution to verify the item in the warehouse is linked to the correct image sequence number and that the ICRE posting flags are all set correctly. This file is created in the item level reconciliation (ILR) format.

The reporting process creates EOD reports that provide audit trails of the day's input. The reports show items and dollar totals for entries and the processing day that can be used to reconcile ECP cash letters. Reports are also generated for all missing, unprocessed, and free items, as well as any image processing errors.

Part of the EOD process is to create activity reports for the current day. These reports include the Daily Dollar Summary, Free Items, Missing Items, Duplicate Image, and Missing/Bad Image reports. These reports are generated from the XREF archive and status/error files generated throughout the processing day.

Early fraud detection is a critical function within all financial institutions. The earlier an item can be detected and reviewed, the greater the chances of identifying a true fraudulent item and handling it appropriately. The fraud detection process allows a financial institution to set up conditions either at the account level or globally, to identify items that should be reviewed on the day they enter the bank via ECP. After the I-string or a M-string (merged string) is created, a process reviews each item to determine if it should be classified as a potential fraud item. The M-string represents the merging of images from the prime pass I-string with corrected reject data. These items are marked for review using either an exception workstation available from the assignee of the present invention, or can be pushed to a server for review.

The above description is generally directed to an embodiment whereby transaction data is received at a first time and image data is received at a second time ("Embodiment 1"). As can be appreciated by those skilled in the art, the first time can be before or after the second time. In an alternate embodiment, transaction and image data are received at the same time ("Embodiment 2"). Embodiment 2 is comprised of the import server process, the entry creation process, the reject repair process, and the XREF archive process of which Embodiment 1 is also comprised. The differences between Embodiment 1 and Embodiment 2 are as follows.

In Embodiment 2, there is no need to generate an EIP sequence number. Under Embodiment 1, the EIP sequence number was associated with the transaction data received at the first time. In Embodiment 2, there is no need for an EIP sequence number because the transaction data and image data are received substantially simultaneously. In addition, in Embodiment 2, substantially all of the items that are assigned an image sequence number eligible to post once the CPCS and reject repair processes are completed. The XREF update process handles the transaction data coming from the import server process.

Embodiment 2 also does not require a post preprocessor to create a new HFID file, since the posting sequence number will be the image sequence number, and substantially all the items that are to be posted will have a corresponding HFID record for HFPT generation.

The image based electronic check presentment system of the present invention can be realized in software or a combination of hardware and software. Any kind of computer system or other apparatus adapted for carrying out the methods described herein is suited. A typical combination of hardware and software in this context could be a host mainframe computer with a computer program that, when loaded and executed, controls the web-based server computer such that it carries out the methods described herein. The image based electronic check presentment system can be embedded in a computer program product, which includes all the features enabling the implementation of the methods described herein, and which, when loaded in a computer system, is able to carry out these methods.

Additionally, the corresponding structures, materials, acts, and equivalents of all means plus function elements in any claims are intended to include any structure, material or acts for performing the functions in combination with other claim elements as specifically claimed.

Those skilled in the art will appreciate that many modifications to the exemplary embodiment of the present invention are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in imitation thereof since the scope of the present invention is defined solely by the appended claims.

What is claimed is:

1. A method for processing electronically presented items, comprising:

receiving from a sending financial institution at a first time a plurality of electronically presented items, wherein one or more of the items received is comprised of a source sequence number generated by the sender of the electronically presented items and transaction data associated with the source sequence number;

for each item received at the first time, assigning an electronic item presentment (EIP) sequence number to the item, associating the item's transaction data with the item's EIP sequence number, and associating the item's EIP sequence number with the item's source sequence number;

receiving from the sending financial institution at a second time image data in a digitized format for one or more of the items received the first time, wherein the image data for each item received at the second time is associated with the item's source sequence number;

for each item's image data received at the second time, assigning an image sequence number to the item's image data, associating the item's image data with the item's image sequence number and associating the item's image sequence number with the item's source sequence number to preserve a linkage integrity between the item and the item's image data; and for each item's image data received at the second time, associating the item's image sequence number with the item's EIP sequence number by matching (i) the source sequence number associated with the item's EIP sequence number received at the first time with (ii) the source sequence number associated with the item's image sequence number received at the second time, wherein the matching step is performed by an electronic item presentment computer.

2. The method of claim 1, wherein the source sequence number is associated with a source identifier and a source processing date to form an item's source key.

3. The method of claim 1, wherein the source sequence number is stored in an archive in a non-volatile memory in association with the EIP sequence number.

4. The method of claim 3, wherein the image sequence number is stored in the archive in association with the EIP sequence number.

5. The method of claim 3, wherein an image key is stored in the archive in association with the HP sequence number.

6. The method of claim 5, wherein the image key is comprised of the image sequence number, a capture date and a capture cycle.

7. The method of claim 1, wherein the image data is stored in an archive in a non-volatile memory in association with the EIP sequence number.

8. The method of claim 7, wherein the image data is stored in an archive in association with the source sequence number.

9. The method of claim 8, wherein the image data is stored in an archive in association with the image sequence number.

10. The method of claim 8, wherein the image data is stored in an archive in association with an image key.

11. The method of claim 10, wherein the image key is comprised of the image sequence number, a capture date and a capture cycle.

12. The method of claim 1, further comprising:

for each of the items to which an EIP sequence number has been assigned, posting the item's transaction data to a posting system and associating the item's posted transaction data with the item's EIP sequence number.

13. The method of claim 1, further comprising:

for each of the items to which an EIP sequence number has been assigned, posting at least some of the item's transaction data to a posting system and associating the item's posted transaction data with the item's EIP sequence number.

14. The method of claim 13, wherein the item's posted transaction data is stored in an archive in a non-volatile memory in association with the item's EIP sequence number.

15. The method of claim 14, wherein the item's posted transaction data is stored in an archive in association with the item's source sequence number.

16. The method of claim 15, wherein the item's posted transaction data is stored in an archive in association with the item's image sequence number.

17. The method of claim 15, wherein the item's posted transaction data is stored in an archive in association with an image key.

18. The method of claim 17, wherein the image key is comprised of the image sequence number, a capture date and a capture cycle.

19. The method of claim 13, wherein the posting system is pre-existing.

20. The method of claim 13, further comprising:

assigning a posting sequence number to each item posted; and associating the item's posting sequence number with the item's posted transaction data.

21. The method of claim 20, wherein the item's posted transaction data is stored in an archive in a non-volatile memory in association with the item's posting sequence number.

22. The method of claim 21, wherein the item's posted transaction data is stored in an archive in association with the item's EIP sequence number.

23. The method of claim 22, wherein the item's posted transaction data is stored in an archive in association with the item's source sequence number.

24. The method of claim 23, wherein the item's posted transaction data is stored in an archive in association with the item's image sequence number.

25. The method of claim 23, wherein the item's posted transaction data is stored in an archive in association with an image key.

26. The method of claim 25, wherein the image key is comprised of the image sequence number, a capture date and a capture cycle.

27. A method for processing electronically presented items, comprising:
receiving from a sending financial institution a plurality of electronically presented items wherein each of the items received is comprised of a source sequence number generated by the sender of the electronically presented items, transaction data associated with the source sequence number and image data in a digitized format associated with the source sequence number; and
for each item received, assigning an image sequence number to the item, and associating the item's image sequence number with the item's source sequence number to preserve a linkage integrity between the item and the item's image data, wherein at least one of the assigning and associating steps are performed by an electronic item presentment computer.

28. The method of claim 27, further comprising:
for each item received, associating the item's image sequence number with the item's image data.

29. The method of claim 28, further comprising:
for each item received, associating the item's image sequence number with the item's transaction data.

30. The method of claim 28, wherein the source sequence number is associated with a source identifier and a source processing date to form an item's source key.

31. The method of claim 28, wherein the source key is stored in an archive in a non-volatile memory in association with the image sequence number.

32. The method of claim 31, wherein an image key is stored in the archive in association with the image sequence number.

33. The method of claim 32, wherein the image key is comprised of the image sequence number, a capture date and a capture cycle.

34. The method of claim 27, wherein the image data is stored in an archive in a non-volatile memory in association with the image sequence number.

35. The method of claim 34, wherein the image data is stored in an archive in association with the source sequence number.

36. The method of claim 35, wherein the image data is stored in an archive in association with an image key.

37. The method of claim 36, wherein the image key is comprised of the image sequence number, a capture date and a capture cycle.

38. The method of claim 27, further comprising:
for at least some of the items to which an image sequence number has been assigned, posting the item's transaction data to a posting system and associating the item's posted transaction data with the item's image sequence number.

39. The method of claim 27, further comprising:
for at least some of the items to which an image sequence number has been assigned, posting at least some of the item's transaction data to a posting system and associating the item's posted transaction data with the item's image sequence number.

40. The method of claim 39, wherein the item's posted transaction data is stored in an archive in a non-volatile memory in association with the item's source sequence number.

41. The method of claim 40, wherein the item's posted transaction data is stored in an archive in association with the item's image sequence number.

42. The method of claim 40, wherein the item's posted transaction data is stored in an archive in association with an image key.

43. The method of claim 42, wherein the image key is comprised of the image sequence number, a capture date and a capture cycle.

44. The method of claim 27, further comprising:
assigning a posting sequence number to each item posted; and
associating the item's posting sequence number with the item's posted transaction data.

45. The method of claim 44, wherein the item's posted transaction data is stored in an archive in a non-volatile memory in association with the item's posting sequence number.

46. The method of claim 45, wherein the item's posted transaction data is stored in an archive in association with the item's EIP sequence number.

47. The method of claim 46, wherein the item's posted transaction data is stored in an archive in association with the item's source sequence number.

48. The method of claim 47, wherein the item's posted transaction data is stored in an archive in association with the item's image sequence number.

49. The method of claim 46, wherein the item's posted transaction data is stored in an archive in association with an image key.

50. The method of claim 49, wherein the image key is comprised of the image sequence number, a capture date and a capture cycle.

51. The method of claim 39, wherein the posting system is pre-existing.

52. A computer readable storage medium storing a computer program product for processing electronically presented items, the computer program product comprising program instructions that when executed on an electronic item presentment computer
receives from a sending financial institution at a first time a plurality of electronically presented items, wherein one or more of the items received is comprised of a source sequence number generated by the sender of the electronically presented items and transaction data associated with the source sequence number;
for each item received at the first time, assigns an electronic item presentment (EIP) sequence number to the item, associates the item's transaction data with the item's EIP sequence number, and associates the item's EIP sequence number with the item's source sequence number;
receives from the sending financial institution at a second time image data in a digitized format for one or more of the items received the first time, wherein the image data for each item received at the second time is associated with the item's source sequence number;
for each item's image data received at the second time, assigns an image sequence number to the item's image data, associates the item's image data with the item's image sequence number and associates the item's image sequence number with the item's source sequence number to preserve a linkage integrity between the item and the item's image data; and
for each item's image data received at the second time, associates the item's image sequence number with the item's EIP sequence number by matching (i) the source sequence number associated with the item's HP sequence number received at the first time with (ii) the source sequence number associated with the item's image sequence number received at the second time.

53. A computer readable storage medium storing a computer program product for processing electronically presented items, the computer program product comprising program instructions that when executed on an electronic item presentment computer:

receives from a sending financial institution a plurality of electronically presented items, wherein each of the items received is comprised of a source sequence number generated by the sender of the electronically presented items, transaction data associated with the source sequence number and image data in a digitized format associated with the source sequence number; and for each item received, assigns an image sequence number to the item, and associates the item's image sequence number with the item's source sequence number to preserve a linkage integrity between the item and the item's image data.

54. A system for processing electronically presented items, comprising:

an electronic item presentment computer including an electronic item processor module, wherein the electronic item processor module when executing on the electronic item presentment computer receives from a sending financial institution and stores at a first time a plurality of electronically presented items, wherein one or more of the items received is comprised of a source sequence number generated by the sender of the electronically presented items and transaction data associated with the source sequence number, and for each item received at the first time, assigns an electronic item presentment (EIP) sequence number to the item;

an import processor module, wherein the import processor module when executing on the electronic item presentment computer receives from the sending financial institution and stores at a second time image data in a digitized format for one or more of the items received the first time, wherein the image data for each item received at the second time is associated with the item's source sequence number, and for each item received at the second time, assigns an image sequence number to the item; and a cross-reference processor module, wherein, the cross-reference processor module when executing on the electronic item presentment computer for each item received the first time, associates the item's transaction data with the item's EIP sequence number, and associates the item's EIP sequence number with the item's source sequence number, for each item's image data received the second time, associates the item's image data with the item's image sequence number and associates the item's image sequence number with the item's source sequence number to preserve a linkage integrity between the item and the item's image data, and for each item received at the second time, associates the item's image sequence number with the item's EIP sequence number by matching (i) the source sequence number associated with the item's EIP sequence number received at the first time with (ii) the source sequence number associated with the item's image sequence number received at the second time.

55. A system for processing electronically presented items, comprising:

an electronic item presentment computer including an import processor module, wherein the import processor module when executing on the electronic item presentment computer receives from a sending financial institution and stores a plurality of electronically presented items, wherein each of the items received is comprised of a source sequence number generated by the sender of the electronically presented items, transaction data associated with the source sequence number and image data in a digitized format associated with the source sequence number, and for each item received, assigns an image sequence number to the item; and a cross reference processor module, wherein, the cross reference processor module when executing on the electronic item presentment computer for each item received, associates the item's image sequence number with the item's source sequence number to preserve a linkage integrity between the item and the item's image data.

* * * * *